United States Patent
Staudenmaier

(10) Patent No.: US 11,225,168 B2
(45) Date of Patent: Jan. 18, 2022

(54) HV ENERGY STORAGE DEVICE

(71) Applicant: AUDI AG, Ingolstadt (DE)

(72) Inventor: Sascha Staudenmaier, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 377 days.

(21) Appl. No.: 16/353,211

(22) Filed: Mar. 14, 2019

(65) Prior Publication Data
US 2019/0283626 A1    Sep. 19, 2019

(30) Foreign Application Priority Data
Mar. 14, 2018   (DE) ..................... 10 2018 203 915.1

(51) Int. Cl.
| | |
|---|---|
| *B60L 58/22* | (2019.01) |
| *H02J 7/00* | (2006.01) |
| *H01M 50/51* | (2021.01) |
| *H01M 50/579* | (2021.01) |
| *H01M 10/44* | (2006.01) |
| *B60L 50/60* | (2019.01) |
| *H01H 39/00* | (2006.01) |
| *H01M 50/502* | (2021.01) |

(52) U.S. Cl.
CPC ............... *B60L 58/22* (2019.02); *B60L 50/66* (2019.02); *H01H 39/004* (2013.01); *H01M 10/441* (2013.01); *H01M 50/502* (2021.01); *H01M 50/51* (2021.01); *H01M 50/579* (2021.01); *H02J 7/0016* (2013.01); *H02J 7/0031* (2013.01); *H01M 2200/00* (2013.01)

(58) Field of Classification Search
None
See application file for complete search history.

(56) References Cited

U.S. PATENT DOCUMENTS

| | | | |
|---|---|---|---|
| 2012/0160584 A1* | 6/2012 | Nitawaki | B60L 50/66 180/68.5 |
| 2012/0229234 A1 | 9/2012 | Wakabayashi et al. | |
| 2013/0234667 A1 | 9/2013 | Norton | |
| 2015/0288199 A1 | 10/2015 | Bui-Van et al. | |
| 2016/0114695 A1 | 4/2016 | Holgers et al. | |

FOREIGN PATENT DOCUMENTS

| | | |
|---|---|---|
| DE | 10 2009 036 672 A1 | 5/2010 |
| DE | 10 2009 056 865 A1 | 6/2011 |
| DE | 10 2010 027 861 A1 | 10/2011 |
| DE | 10 2011 054 146 A1 | 4/2012 |
| DE | 10 2012 009 219 A1 | 8/2013 |
| WO | 2015/078049 A1 | 6/2015 |

OTHER PUBLICATIONS

Examination Report dated Dec. 13, 2018 of corresponding German application No. 10 2018 203 915.1; 20 pages.

* cited by examiner

*Primary Examiner* — Sarah A. Slifka
*Assistant Examiner* — Patrick Marshall Greene
(74) *Attorney, Agent, or Firm* — Maier & Maier, PLLC

(57) ABSTRACT

An HV energy storage device for a motor vehicle as well as a method for operating the HV energy storage device.

8 Claims, 3 Drawing Sheets

HV ENERGY STORAGE DEVICE

FIELD

Exemplary embodiments of the invention relate to an HV energy storage device for a motor vehicle as well as a method for operating the HV energy storage device.

BACKGROUND

High demands regarding crash safety are made on high-voltage energy storage devices (HV energy storage devices) for motor vehicles, for example under-vehicle batteries for battery electric vehicles (BEVs) In the event of an accident, the HV energy storage devices must be isolated from the vehicle's HV system as quickly as possible. So-called pyrotechnic isolation elements are frequently used for this.

To ensure they are not damaged in the event of a crash, all HV components receive armored protection, which increases the weight, complexity, installation space, and costs of the HV system. Thus, HV energy storage devices, for example, under-vehicle batteries for BEVs, have switching mechanisms arranged between the HV battery and converter, so-called battery junction boxes (BJBs), with which the HV system of the vehicle and the HV battery can be connected or disconnected as necessary.

One such type of BJB is known, for example, from DE 10 2010 027 861 A1. A coupling unit for a battery module is presented, having first and second inputs and outputs, which can be connected and/or disconnected in response to a control signal. The switching unit ensures that the HV battery can be connected to the HV system of the vehicle and then switched off, completely electrically isolated from the HV system, at the end of the trip.

Said BJBs are typically arranged in front of or behind the HV battery, which causes problems in the event of front- and rear-end crashes and makes corresponding clearances, armoring measures, etc. necessary. If the BJB is arranged in front, for example, long electric cables are required from the battery to the power electronics or an axle drive on the rear axle. The HV cables are routed in a protected manner, with armor, and with aramid tubing so that they are not damaged. Because what occurs in a crash in actual operation does not always correspond to the conditions of the legally prescribed crash tests, the components are designed for high demands as a precaution.

However, HV systems are increasingly having to fulfill more demands regarding availability, redundancy, and fallback options, because failure of the HV battery on a battery electric vehicle inevitably leads to breakdown of the vehicle. Therefore, in order to provide its contribution, the HV battery is designed in a very complex way and employs a great deal of technology. Each individual HV component, moreover, has a series of suppressor circuits, active and passive discharges, etc.

SUMMARY

Against this background, the object of the present invention is to provide an HV energy storage device which achieves high crash safety and fail-safe operation and has less complexity and can be implemented with less engineering expense. In addition, methods for operating an HV energy storage device which enable a high level of availability of the HV energy storage device and safe switch-off as well as instant discharging of the entire HV system in the event of a vehicle accident are provided.

The object is achieved according to the invention by means of an HV energy storage device and a method. The embodiments result from the dependent claims and the description.

DE 10 2011 054 146 A1 discloses a known bypass circuit for a battery system having battery modules connected in parallel, each of which comprises a plurality of battery cells connected in series. Each battery module has a control unit, with which the battery module can be isolated from the other battery modules in the event of failure or impending failure of the battery cells, in order to prevent total failure of the system.

DE 10 2012 009 219 A1 discloses a battery module having battery cells connected in series and a DC/DC converter. The DC/DC converter has a first input and a second input, wherein a first switching element is assigned to the first input and a second switching element is assigned to the second input, wherein the switching elements each have an output permanently connected to the assigned input as well as a first and a second input which can optionally be switched to the converter output.

DE 10 2009 036 672 A1 discloses a low-voltage safety switch for a high-voltage system of a motor vehicle as well as a method for simplifying the switch-off procedure of an HV system, in which a switching device having a first switch is used to isolate a first connection from a second connection and a second switch used to isolate a third connection from a fourth connection. This is a so-called 12-V service disconnect, a circuit breaker, which is tripped pulled when work is to be performed safely on the HV system in the shop or revisions are to be made.

According to the invention, the HV energy storage device (e.g. an HV battery) is divided into at least two cell modules, battery halves, or banks for driving the vehicle. This results in a redundant battery containing at least two battery halves or a plurality of cell modules. In the event of failure of a cell or a cell module in a bank, switchover to the still-intact part of the energy storage device occurs automatically, particularly reversibly and without interruption. In one embodiment, the switchover occurs by means of a compact multiway switching element. The multiway switching element makes it possible to achieve complete redundancy of the HV energy system of a motor vehicle with the existing components, cells, and cell modules, without additional cabling complexity.

The subject matter of the invention is an HV energy storage device for a motor vehicle comprising two or more battery modules connected in series, wherein a multiway switching element is arranged between every two battery modules. The multiway switching element is configured to optionally connect the two battery modules to one another electrically, to bypass one of the two battery modules, or to bypass both battery modules.

In one embodiment, the multiway switching element comprises at least one pyrotechnic short-circuit element. In the event of a motor vehicle crash (a "crash situation," for example the vehicle impacts an obstacle, another vehicle impacts the vehicle, arcing of the vehicle, etc.), said short-circuit element is configured to detonate and cause the multiway switching element to electrically isolate both battery modules. The pyrotechnic short-circuit element is capable of (irreversibly) electrically isolating the HV energy storage device in a very short time and short-circuiting or instantly discharging the DC bus circuit of the motor vehicle.

In one embodiment, the multiway switching element comprises five tubular sockets, arranged flush with one another, having terminals, in which a conductive cylinder is arranged so as to move. The cylinder is configured to connect two adjacent sockets to each other in an electrically conductive manner.

In a special embodiment, the multiway switching element comprises five tubular sockets arranged flush above one another and spring elements, as they are known from sockets of electrical plugs. These sockets are electrically connected to the at least two banks of the HV energy storage device. The cylindrical channel formed by the tubular sockets contains a conductive cylinder, which is movable in the channel and electrically connects two adjacent sockets out of the five sockets to one another.

In the starting position, the cylinder connects two sockets which are connected to oppositely charged poles of the two banks and thereby establishes a series connection of the banks, whereby the full battery voltage is present at the output of the HV energy storage device.

If a bank fails, the cylinder is moved into a position in which it connects two sockets, of which one is connected to a pole of the still-functioning bank and the other to a bypass line that bypasses the defective bank. The still-intact bank can thereby continue to provide or store current and the HV energy storage device still has half of the nominal voltage.

If both banks of the HV energy storage device are intact, this cylinder position can be used in order to halve the high voltage appropriate for operating the vehicle, e.g. for charging at a charging station that can only provide low voltage. The two banks of the HV energy storage device can then intermittently be charged with the lower voltage, in series, and the cylinder is subsequently is moved back to the starting position so that the full battery voltage is available.

In one embodiment of the multiway switching element, upon an accident with the vehicle, the pyrotechnic short-circuit element is configured to move the conductive cylinder into a position in which it connects two sockets, the terminals of which are each connected to an output pole of the HV energy storage device (positive pole or negative pole), to one another in an electrically conductive manner.

In the event of a crash, the cylinder is moved pyrotechnically, independently of its current position, into a position in which it electrically connects two sockets that are connected to bypass lines. Both banks are thereby electrically isolated and the DC bus circuit of the vehicle is short-circuited or instantly discharged (irreversibly).

In another embodiment of the HV energy storage device, the multiway switching element comprises two contactors with a currentless, electrically isolated middle position. In this embodiment, the switchover, isolation, and short-circuit function are implemented with contactors. Said contactors have a currentless, completely electrically isolated middle position and offer, in one component, a switching option instead of a pure switch-on option as with conventional contactors which are used in the connection cables of HV energy storage devices with some HV systems. Components available in existing systems can thus be easily replaced by upgrading. In one embodiment, the contactors are arranged offset by 90° to one another, in relation to an alignment (X, Y, or Z), such that undesired forces from a crash due to mass inertia can only interfere with a maximum of one of the two contactors moving into the necessary position.

In a special embodiment, additionally a pyrotechnic short-circuit element is used which likewise isolates the vehicle's HV system in the event of a crash and short-circuits the DC bus circuit while the contactors are still open. In one embodiment, the pyrotechnic short-circuit element is configured to connect two terminals of the multiway switching element, each connected to an output pole (positive pole or negative pole) of the HV energy storage device, in an electrically conductive manner.

In one embodiment of the invention, the junction box (BJB) is no longer arranged in front or behind or outside of the HV energy storage device but rather in the middle.

The HV energy storage device in this variant has a battery junction box (BJB) arranged in the middle of the HV energy storage device.

The individual banks and/or cell modules are electrically connected in front and behind such that their four electrical outputs converge correspondingly in the middle of the vehicle or the middle of the battery and are connected there. Due to the arrangement of the junction box in the middle, the HV connections to the power electronics or the axle drives for the front (VA) and/or rear axles (HA) are of equal length and always as short as possible. The junction box with this arrangement is crash-protected as well as possible and no additional protective measures, such as armoring, are necessary.

The subject matter of the invention also comprises methods for operating an HV energy storage device according to the invention.

In one embodiment of the method, the multiway switching element automatically, particularly reversibly and without interruption, bypasses a battery module in the event of failure.

Even with complete failure of an individual cell or a cell module, the series connection is not interrupted, but rather is simply switched over to the intact bank so that the vehicle drive can be maintained with half the operating voltage, which is absolutely required for the redundant design of energy storage devices for highly automated driving.

In another embodiment of the method, the multiway switching element automatically isolates both battery modules from each other electrically and/or from the vehicle's HV system in the event of a vehicle accident.

In one variant, crash isolation of the HV battery is implemented with the assistance of pyrotechnic measures. This offers the advantage of increasing the safety of the overall system and makes it possible to take over several protective functions installed redundantly from the individual HB components such as the power electronics, air-conditioning compressor, high-voltage heating system, etc., because the protective function is taken on by the HV battery centrally. Another advantage is the omission of active discharging mechanisms in each individual HB component, because, in the event of a crash, all HV components are already discharged completely simultaneously and within the shortest amount of time by the pyrotechnic short-circuit element. By omitting the passive discharging mechanisms in the HV components, the power consumption of the overall vehicle during operation may optionally be lowered as well.

In another embodiment of the method, the multiway switching element initially bypasses one of the two battery modules reversibly during the charging process of an HV energy storage device until it has charged completely, then bypasses the other battery module reversibly until it is also completely charged, and subsequently connects the two battery modules back together electrically.

In this method variant, the series connection of the battery modules is temporarily converted into a parallel connection. This makes it possible, for example, to halve the high voltage appropriate for operation in order to charge at a charging station without such high voltage.

Additional advantages and embodiments of the invention result from the description and the corresponding drawings.

It is clear that the aforementioned features and those to be explained in the following can not only be used in the combinations indicated but also in other combinations or alone without going beyond the scope of the present invention.

BRIEF DESCRIPTION OF THE FIGURES

Exemplary embodiments of the invention are schematically shown in the drawings by means of embodiments and are described schematically and extensively with reference to the drawings. The following are shown.

DETAILED DESCRIPTION

Figure 1:
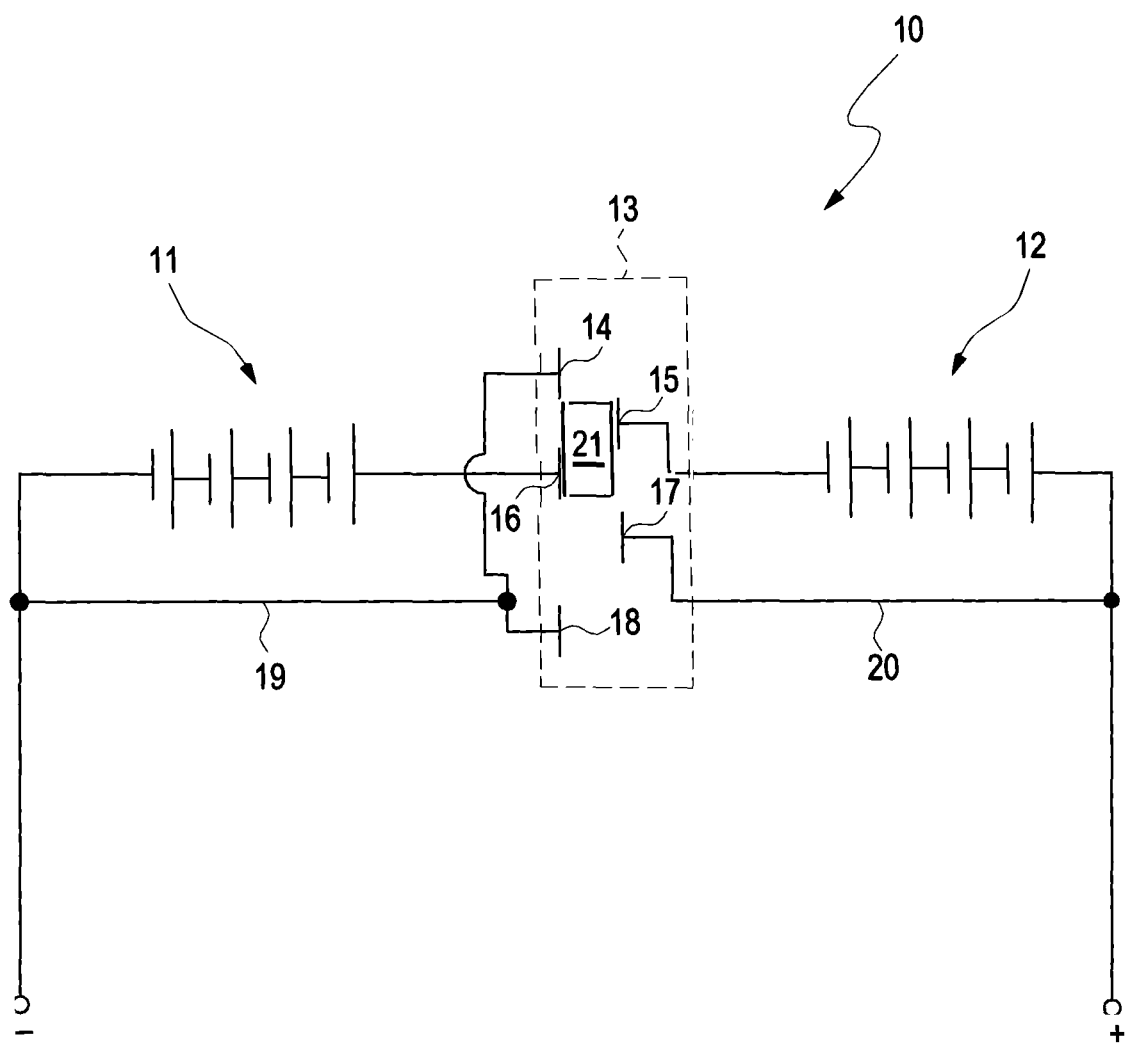
FIG. 1 shows a schematic representation of an embodiment of the HV energy storage device according to the invention.

FIG. 1 schematically shows an embodiment of the HV energy storage device 10 according to the invention. The HV energy storage device 10 comprises two battery modules, 11 and 12, which are connected in series. A multiway switching element 13 with five terminals 14, 15, 16, 17, 18 is located between the battery modules 11, 12. Terminal 15 is connected to the negative pole of battery module 12, and terminal 16 is connected to the positive pole of battery module 11. The remaining terminals 14, 17, 18 are connected to bypass lines 19, 20. A contact element 21 in the multiway switching element 13 establishes, depending on the position, an electrically conductive connection between two of terminals 14, 15, 16, 17, 18. In a first position I, the contact element 21 connects, as shown in the drawing, terminals 15 and 16 and thus establishes a series connection of battery modules 11 and 12. In the event of failure of battery module 11, the contact element 21 is moved into a second position II, in which it connects terminals 14 and 15. Battery module 12 can continue to provide or store electrical energy via the bypass line 19 so that the entire HV energy system does not fail. In the event of failure of battery module 12, the contact element 21 is moved into a third position III, in which it connects terminals 16 and 17. Battery module 11 can continue to provide or store electrical energy via the bypass line 20 so that the entire HV energy system does not fail. In a fourth position IV, the contact element 21 connects terminals 17 and 18, whereby both battery modules 11, 12 and thus the entire HV energy storage device are bypassed.

Figure 2:
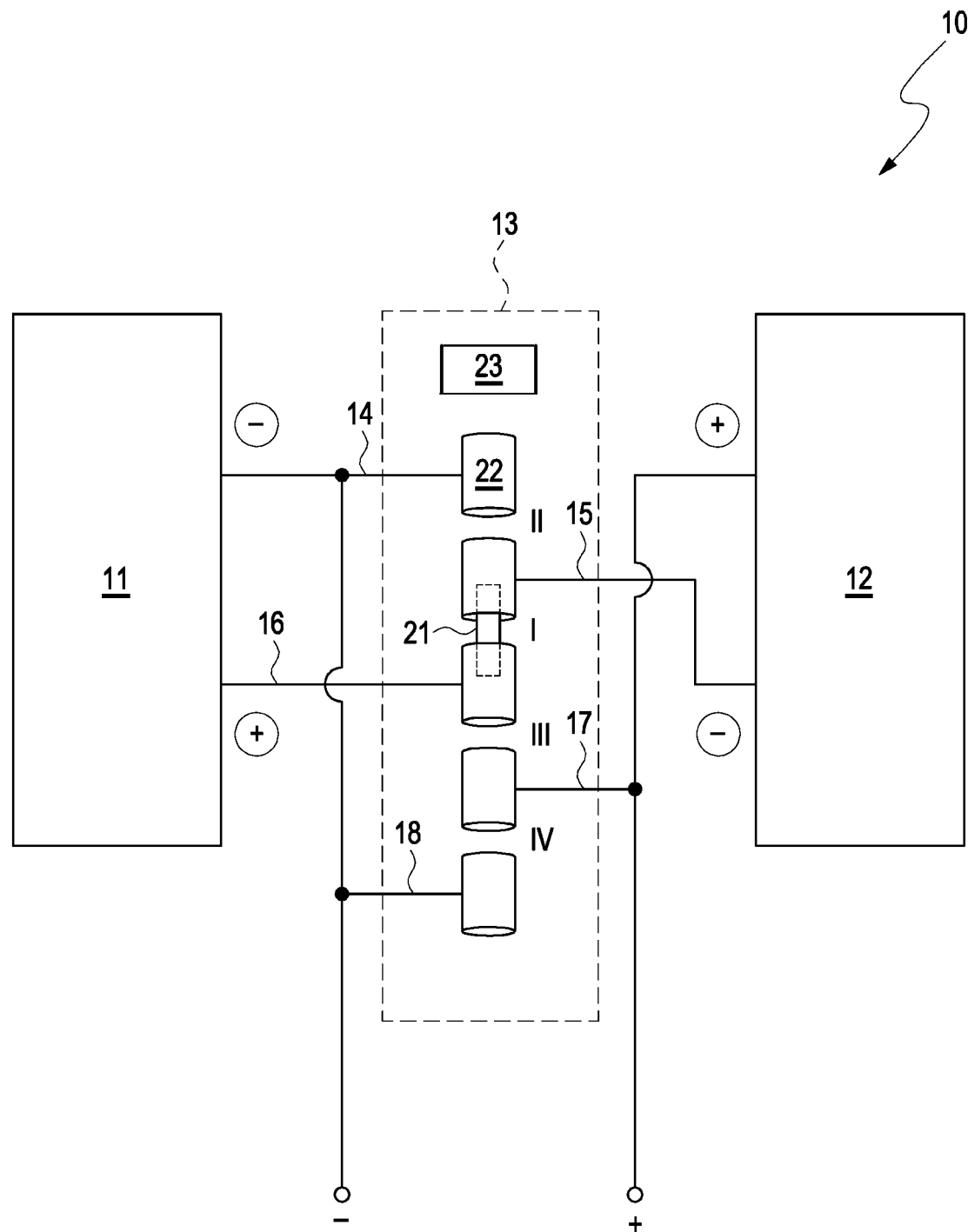
FIG. 2 shows a schematic representation of a different embodiment of the HV energy storage device according to the invention.

In a special embodiment of the multiway switching element, which is shown in FIG. 2, the terminals 14, 15, 16, 17, 18 are each connected to a tubular socket 22 with spring elements as known from the sockets of electrical plugs. Five of these sockets 22 are arranged in the multiway switching element 13 flush above one another and thus form a cylindrical channel in which a conductive cylinder is arranged as a movable contact element 21 and connects two adjacent sockets 22 with one another electrically. The multiway switching element 13 further comprises a pyrotechnic element 23, which ignites in the event of a crash and conveys the conductive cylinder into the bottommost position IV such that both banks (battery modules 11, 12) of the HV energy storage device 10 are electrically isolated and the DC bus circuit is short-circuited and/or instantly discharged.

Figure 3:
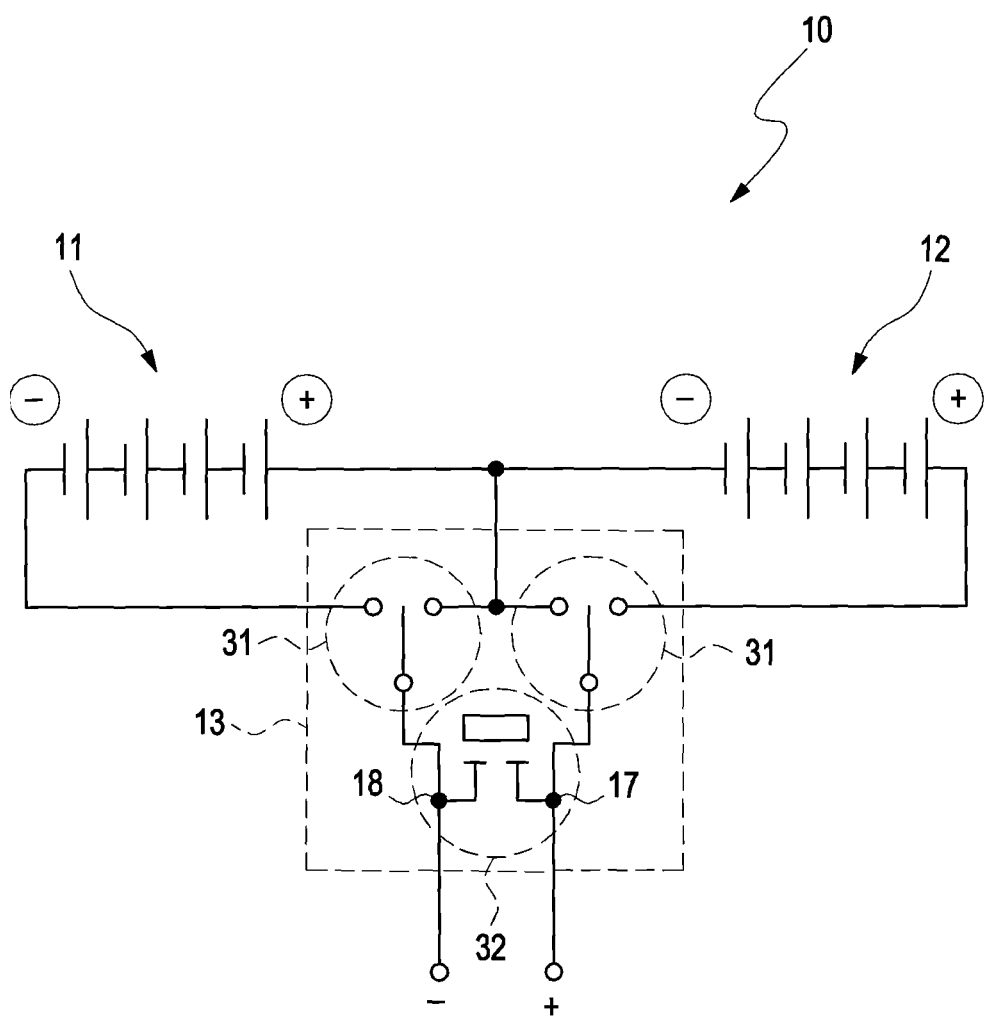
FIG. 3 shows a schematic representation of a further embodiment of the HV energy storage device according to the invention.

FIG. 3 schematically shows a further embodiment of the HV energy storage device 10 according to the invention with two battery modules, 11 and 12, connected in series. A multiway switching element 13 comprising two contactors 31 with a currentless electrically isolated middle position is arranged between the battery modules 11, 12. The switchover, isolation, and short-circuit functions in this embodiment are implemented with contactors 31 having a currentless, completely electrically isolated middle position and thus providing a switchover function instead of a pure switch-on function. In addition, the multiway switching element 13 comprises a pyrotechnic short-circuit element 32, which electrically isolates the HV energy storage device and short-circuits the DC bus circuit of the vehicle while the contactors are still open.

LIST OF REFERENCE SYMBOLS

10 HV Energy storage device
11 Battery module
12 Battery module
13 Multiway switching element
14 Terminal
15 Terminal
16 Terminal
17 Terminal
18 Terminal
19 Bypass line
20 Bypass line
21 Contact element
22 Socket with spring element
23 Pyrotechnic element
31 Contactor with currentless electrically isolated middle position
32 Pyrotechnic short-circuit element

The invention claimed is:

1. An HV energy storage device for a motor vehicle, comprising:
   a plurality of battery modules connected in series,
   wherein the plurality of battery modules are arranged in exclusive pairs, each pair comprising a multiway switching element arranged between a first battery module and a second battery module of the pair,
   wherein the multiway switching element is configured to interchangeably connect and bypass the first and second battery modules by reversibly moving a contact element,
   wherein, in a first position, the contact element establishes a series connection of the first and second battery modules in operable connection with the HV energy storage device,
   wherein, in a second position, the contact element bypasses the first battery module and operatively connects the second battery module with the HV energy storage device,
   wherein, in a third position, the contact element bypasses the second battery module and operatively connects the second battery module with the HV energy storage device,
   wherein, in a fourth position, the contact element bypasses both the first and second battery modules,
   wherein the multiway switching element further comprises at least one pyrotechnic short-circuit element, which is configured to ignite and irreversibly move the contact element into the fourth position.

2. The HV energy storage device according to claim 1, wherein the multiway switching element comprises five tubular sockets, arranged flush with one another and having terminals,
   wherein the contact element is formed as a conductive cylinder, which is configured to move along the five tubular sockets in order to connect two adjacent sockets with one another in an electrically conductive manner.

3. The HV energy storage device according to claim 1, wherein the contact element is formed as two switches, each of the two switches having a currentless, electrically isolated middle position.

4. The HV energy storage device according to claim 3, wherein a pyrotechnic short-circuit element is configured, in the event of a motor vehicle accident, to connect two terminals of the multiway switching element in an electrically conductive manner, each of the two terminals being connected to a pole of the HV energy storage device.

5. The HV energy storage device according to claim 1 having a battery junction box arranged in the middle of the HV energy storage device.

6. The HV energy storage device according to claim 1, wherein, in the event of failure of a battery module, the multiway switching element bypasses the first and/or second battery modules automatically, particularly reversibly and without interruption.

7. The HV energy storage device according to claim 1, wherein the multiway switching element bypasses both battery modules automatically in the event of a motor vehicle accident.

8. The HV energy storage device according to claim 1, wherein the multiway switching element initially reversibly bypasses the first battery module during a charging process of the HV energy storage device until the first battery module is completely charged, and then reversibly bypasses the second battery module until the second battery module is fully charged, and subsequently connects both battery modules back to one another electrically.

* * * * *